(12) United States Patent
Fukuda

(10) Patent No.: US 11,825,045 B2
(45) Date of Patent: Nov. 21, 2023

(54) IMAGE FORMING APPARATUS WITH REMOVABLE TOP PLATE COVER SECURED WITH UNDERSURFACE SCREWS

(71) Applicant: CANON KABUSHIKI KAISHA, Tokyo (JP)

(72) Inventor: Takeshi Fukuda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/717,841

(22) Filed: Apr. 11, 2022

(65) Prior Publication Data

US 2022/0345577 A1 Oct. 27, 2022

(30) Foreign Application Priority Data

Apr. 23, 2021 (JP) ................................. 2021-073473

(51) Int. Cl.
G03G 15/00 (2006.01)
H04N 1/00 (2006.01)
G03G 21/16 (2006.01)

(52) U.S. Cl.
CPC ..... *H04N 1/00551* (2013.01); *G03G 21/1619* (2013.01); *G03G 21/1633* (2013.01); *G03G 21/1647* (2013.01); *H04N 1/00559* (2013.01)

(58) Field of Classification Search
CPC .......... G03G 21/1619; G03G 21/1633; G03G 21/1642; G03G 21/1647; H04N 1/00551; H04N 1/00559
See application file for complete search history.

(56) References Cited

U.S. PATENT DOCUMENTS

| 6,580,886 B1* | 6/2003 | Howard ............. | G03G 21/1619 |
| | | | 399/110 |
| 2009/0218472 A1* | 9/2009 | Takemoto .......... | G03G 21/1619 |
| | | | 248/542 |
| 2016/0209802 A1 | 7/2016 | Yoshida et al. ..... | G03G 21/1685 |
| 2017/0108818 A1* | 4/2017 | Hashimoto ........ | G03G 21/1642 |
| 2021/0302899 A1* | 9/2021 | Sato ................... | G03G 21/1619 |

FOREIGN PATENT DOCUMENTS

JP H09-246742 9/1997
JP 2007-147873 6/2007

* cited by examiner

*Primary Examiner* — Sophia S Chen
(74) *Attorney, Agent, or Firm* — Venable LLP

(57) ABSTRACT

An image forming apparatus includes a frame, a top plate cover removable from the frame and having a top surface portion constituting a part of a top surface of the image forming apparatus, and a screw. The frame includes an upper surface portion opposite to the top surface portion, a front surface portion provided at a front side with respect to the upper surface portion, and a back surface portion provided at a back side with respect to the upper surface portion and provided with a through-hole. The top plate cover includes a first mounting portion fixed to the front surface portion, and a second mounting portion provided at a back side with respect to the first mounting portion and inserted into the through-hole. The screw is inserted in a front-back direction to fix the front surface portion of the frame and the first mounting portion.

19 Claims, 7 Drawing Sheets

IMAGE FORMING APPARATUS WITH REMOVABLE TOP PLATE COVER SECURED WITH UNDERSURFACE SCREWS

BACKGROUND OF THE INVENTION

Field of the Invention

The present invention relates to an image forming apparatus comprising a top plate cover.

Description of the Related Art

Conventionally, in order that a front surface portion of an exterior top plate of an image forming apparatus and a front surface portion of an exterior top plate of a post-processing apparatus are aligned on a straight line when the image forming apparatus is connected to the post-processing apparatus, there is a case in which an adjustable fastening member is provided on a side surface of each of the exterior top plates (Japanese Patent Application Laid-Open No. 2007-147873). In addition, there has been proposed an image forming apparatus in which an upper cover is mounted to the main body of an image forming apparatus by shoulder screws to reduce the number of fixing screws, and when the upper cover is removed from the main body, the upper cover is slid to facilitate the removal thereof (Japanese Patent Application Laid-Open No. H09-246742).

The fastening member disclosed in the Japanese Patent Application Laid-Open No. 2007-147873 makes it possible to align the exterior top plates. However, since the fastening member is provided on the side surface of the apparatus, it is necessary to move the adjacent apparatus or remove the top plate of the adjacent apparatus in order to adjust the fastening member. Therefore, when performing maintenance that requires the removal of the exterior top plate, it takes a lot of work and time.

As disclosed in the Japanese Patent Application Laid-Open No. H09-246742, when the upper cover (top plate) is fastened to the apparatus main body from the upper surface side, it is not necessary to move the adjacently connected apparatus when removing the upper cover. However, since the screw holes are provided in a flat portion of the upper surface of the upper cover, it is difficult for the user to work on the flat portion of the upper cover. For example, in a user operation of a POD (Print on Demand) product (a product by a quick printing for printing a small number of copies), the screw holes may cause difficulties when the user writes a note about an output product on paper placed on the flat portion of the upper cover.

SUMMARY OF THE INVENTION

Therefore, it is an object of the present invention to make a top plate cover easily removable from a front of an image forming apparatus.

According to an embodiment of the present invention, an image forming apparatus configured to form an image on a recording medium, the image forming apparatus comprises:
 a frame;
 a top plate cover which is removable from the frame and has a top surface portion constituting at least a part of a top surface of the image forming apparatus,
  wherein the frame includes an upper surface portion opposite to the top surface portion, a front surface portion provided at a front side with respect to the upper surface portion in a front-back direction of the image forming apparatus, and a back surface portion provided at a back side with respect to the upper surface portion in the front-back direction and provided with a through-hole, and
  wherein the top plate cover includes a first mounting portion fixed to the front surface portion, and a second mounting portion provided at a back side with respect to the first mounting portion in the front-back direction and inserted into the through-hole; and
 a screw inserted in the front-back direction to fix the front surface portion of the frame and the first mounting portion of the top plate cover.

Further features of the present invention will become apparent from the following description of exemplary embodiments with reference to the attached drawings.

DESCRIPTION OF THE EMBODIMENTS (Image Forming System)

Figure 1:
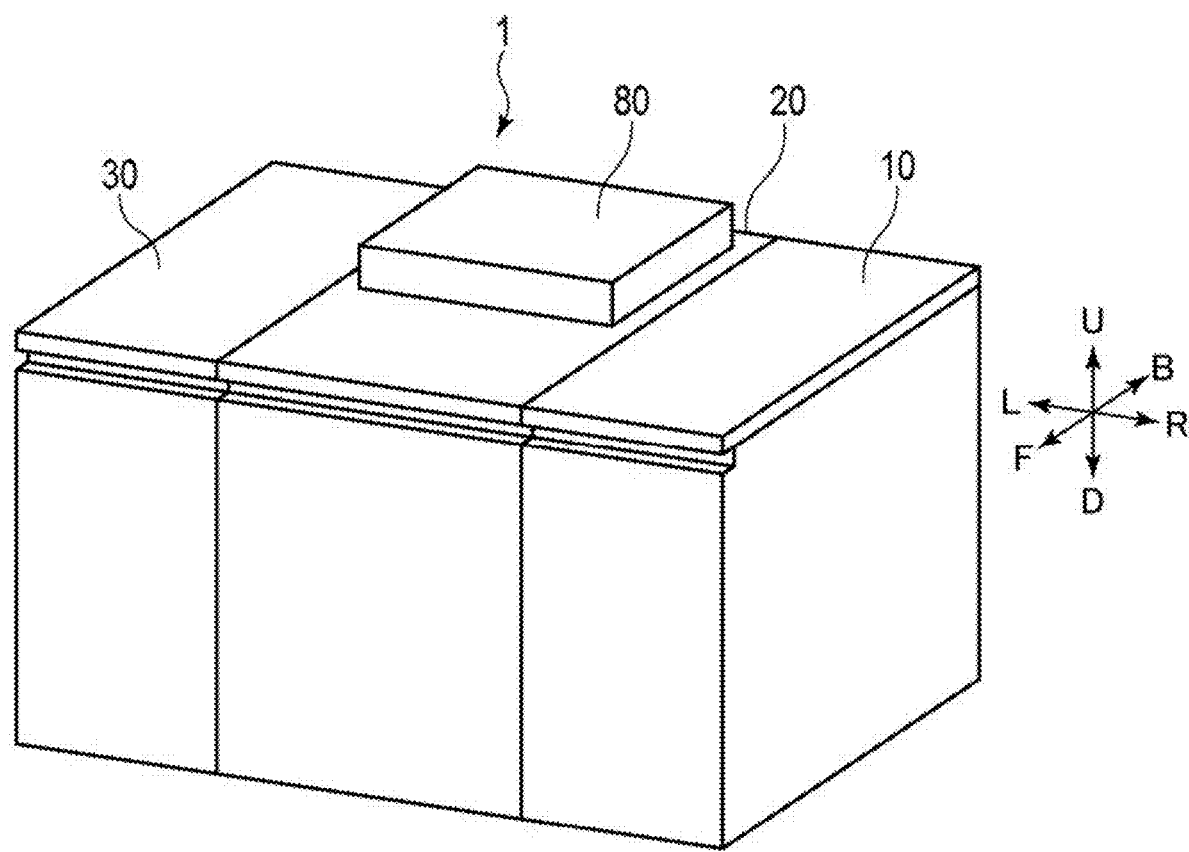
FIG. 1 is a perspective view of an image forming system.

The configuration of an image forming system 1 will be hereinafter described with reference to FIG. 1. FIG. 1 is a perspective view of the image forming system 1. When viewed from the front of the image forming system 1, a direction toward the front side is referred to as a forward direction F, a direction toward the back side is referred to as a backward direction B, a direction toward the right side is referred to as a right direction R, a direction toward the left side is referred to as a left direction L, a direction toward the upper side is referred to as an upward direction U, and a direction toward the lower side is referred to as a downward direction D. In FIG. 1, in the image forming system 1, a feeding apparatus 10, an image forming apparatus 20 and a post-processing apparatus 30 are arranged adjacently in this order from the right side to the left direction L. The feeding apparatus 10 is connected to the image forming apparatus 20, and the image forming apparatus 20 is connected to the post-processing apparatus 30.

In the image forming operation, the feeding apparatus 10 feeds a recording medium (hereinafter referred to as a sheet) on which an image is formed to the image forming apparatus 20. The sheet may be a sheet of a material such as a paper such as a plain paper and a thick paper, a special paper such as a coated paper, a resin sheet such as a plastic film for an overhead projector, and a cloth, and the sheet may be a sheet of any shape such as an envelope and an index sheet. The sheet on which the image is formed by the image forming apparatus 20 is discharged from the image forming apparatus 20 to the post-processing apparatus 30.

The feeding apparatus 10 has a sheet storing portion (not shown) configured to store a large number of sheets. The feeding apparatus 10 feeds the sheets one by one to the image forming apparatus 20 from the sheet storing portion (not shown) according to an image forming instruction.

The image forming apparatus 20 includes, for example, an engine portion (not shown) configured to form an image with toner on a sheet using an electrophotographic method. The engine portion (not shown) forms an image on a sheet fed from the feeding apparatus 10. The engine portion includes a photosensitive drum, a charging unit configured to uniformly charge the photosensitive drum, an exposure unit configured to form an electrostatic latent image on the photosensitive drum, a developing unit configured to supply the toner to the photosensitive drum, and a drive unit configured to drive them. The engine portion is an example of an image forming unit. The image forming apparatus 20 discharges the sheet on which the image is formed to the post-processing apparatus 30. The image forming apparatus 20 is such an apparatus configured to form a color image or a monochrome image on a sheet as a copying machine, a printer, a facsimile machine, a multifunction peripheral, or the like.

The post-processing apparatus 30 performs a post-processing on the sheet on which the image is formed by the image forming apparatus 20. The post-processing apparatus 30 performs a post-processing such as flattening a sheet, bundling a plurality of sheets, stapling a plurality of sheets, and the like. The post-processing apparatus 30 discharges the sheet to a discharge tray (not shown).

(Image Forming Apparatus)

Figure 2:
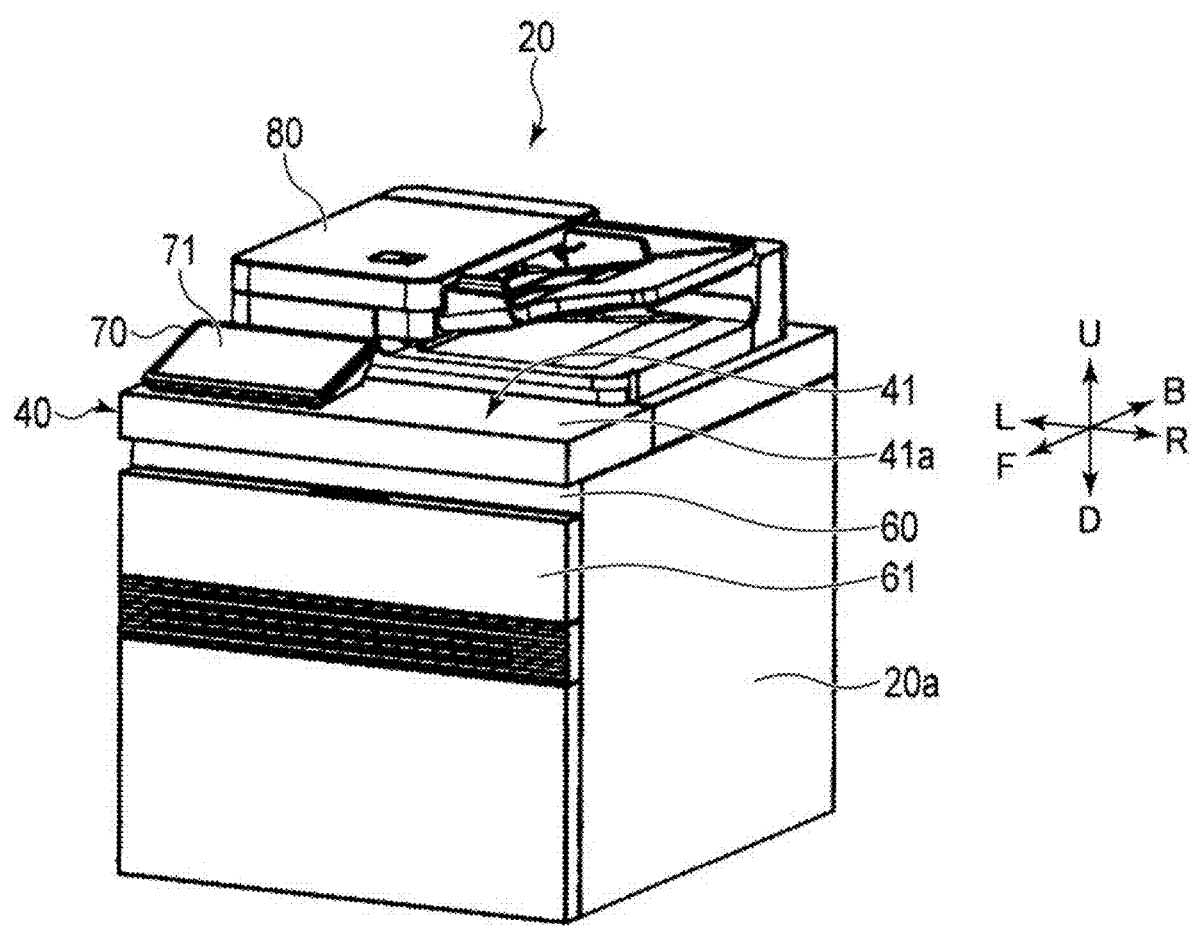
FIG. 2 is a perspective view of an image forming apparatus.
Figure 3:
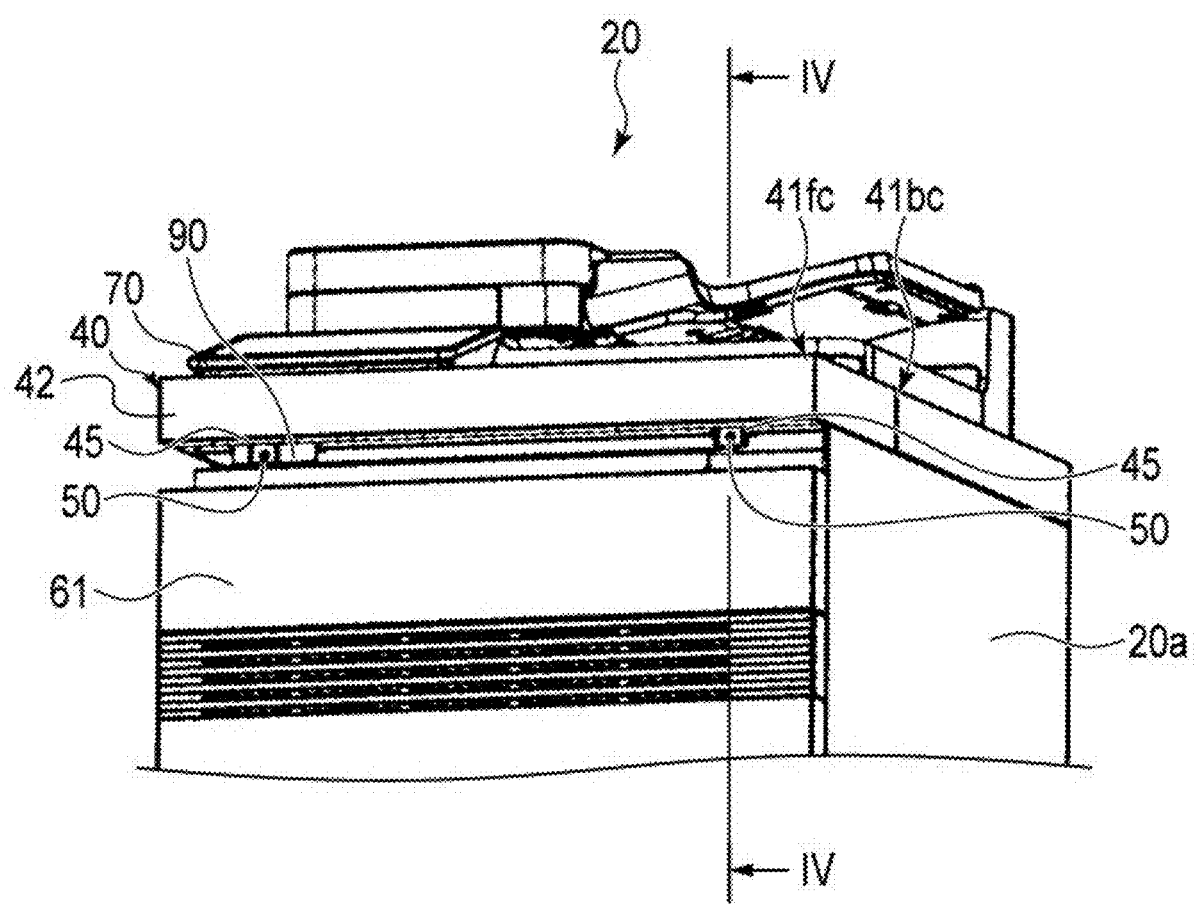
FIG. 3 is a perspective view of the image forming apparatus from which a front surface upper cover is removed.
Figure 4:
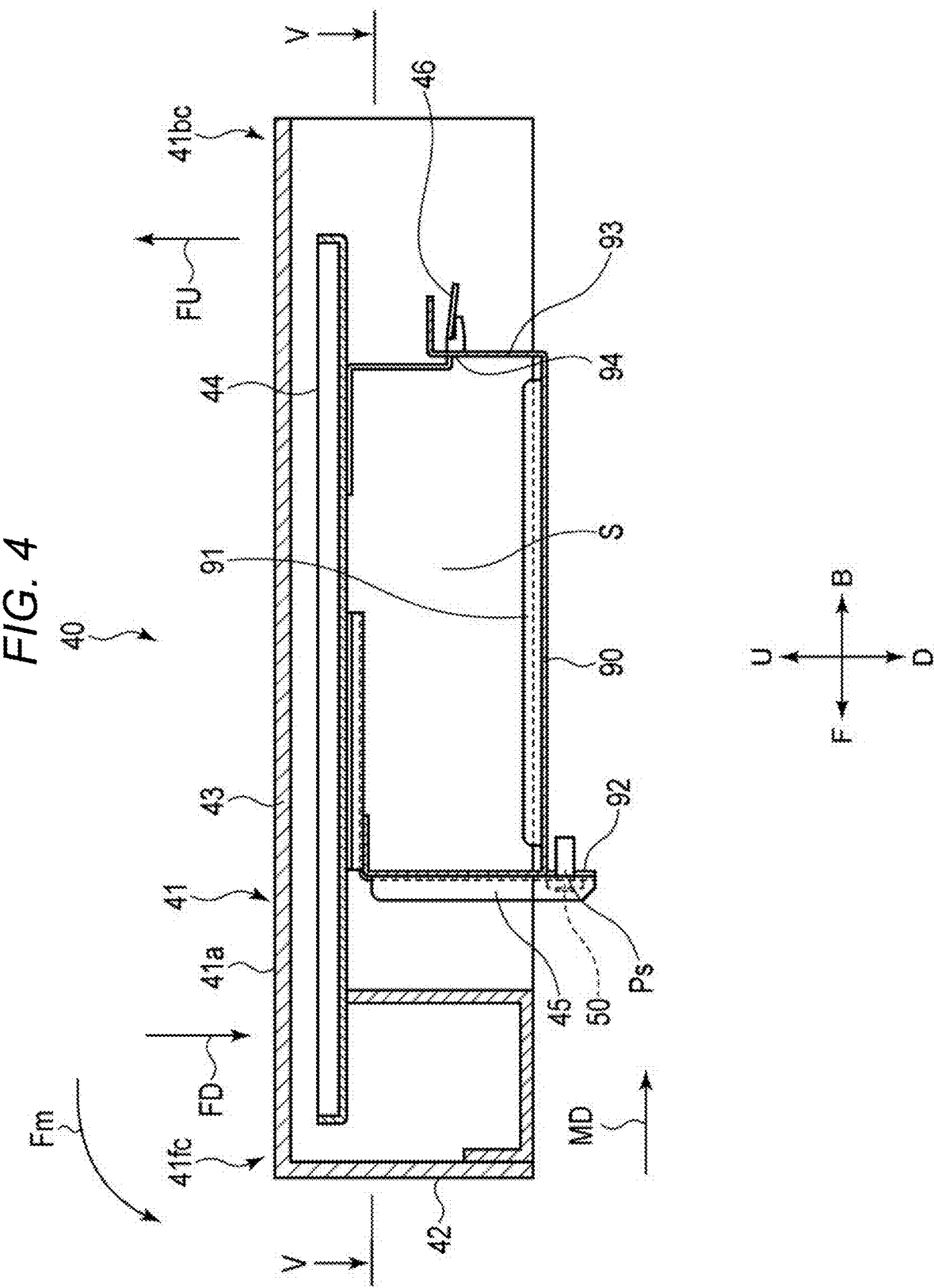
FIG. 4 is a vertical cross-sectional view of a top plate cover taken along line IV-IV of FIG. 3.

Next, the configuration of the image forming apparatus 20 will be described with reference to FIG. 2, FIG. 3, and FIG. 4. FIG. 2 is a perspective view of the image forming apparatus 20. An upper portion of the image forming apparatus 20 is provided with a top plate cover 40, an operation portion 70, and an image reading portion 80. A front surface upper cover 60 and a front door 61 are provided at a front portion of the image forming apparatus 20. FIG. 3 is a perspective view of the image forming apparatus 20 from which the front surface upper cover 60 is removed. FIG. 4 is a vertical cross-sectional view of the top plate cover 40 taken along line IV-IV of FIG. 3.

The top plate cover 40 is disposed on the front side (the forward direction F) of the upper portion of the image forming apparatus 20. The top plate cover 40 covers the front portion of the upper portion of the image forming apparatus 20. The top plate cover 40 is supported by a frame 90 which is a main skeleton of the image forming apparatus 20. A flat surface portion 41a is provided on an upper surface 41 of the top plate cover 40. The flat surface portion 41a has a flat surface on which a user can work, such as writing notes for printing or bundling printed sheets.

The operation portion 70 is provided on the upper surface 41 of the top plate cover 40. The user can operate the image forming system 1 by operating the operation portion 70. The operation portion 70 is provided with a touch panel 71. The touch panel 71 displays image forming information and operation buttons that are operated by the user to operate the image forming system 1.

The image reading portion 80 is disposed on the back side (the backward direction B) of the image forming apparatus 20 with respect to the operation portion 70. The image reading portion 80 reads the image of the original and outputs the image data to the image forming apparatus 20.

The image forming apparatus 20 forms (copies) an image of an original on a sheet based on the image data read by the image reading portion 80, and outputs the image data to an external device (not shown).

The front door 61 is provided on the front surface of the image forming apparatus 20 and is openable and closable around a pivot axis (not shown) extending in a width direction (LR direction). The front door 61 is opened to replace a toner bottle (not shown) which is a consumable of the engine portion (not shown) provided in the image forming apparatus 20 and to maintain an internal unit (not shown) or the like.

The front surface upper cover 60 is provided below the top plate cover 40 (in the downward direction D) and above the front door 61 (in the upward direction U) on the front surface of the image forming apparatus 20. The front surface upper cover 60 is removably mounted to a main body 20a of the image forming apparatus 20. The front surface upper cover 60 covers a portion between the top plate cover 40 and the front door 61, and also has a design property. In the embodiment, the apparatus main body 20a includes the frame 90, the engine portion, and internal parts supported by the frame 90.

As shown in FIG. 4, a space S is provided between the top plate cover 40 and a frame upper surface portion 91 of the frame 90. In the space S, a near field communication device such as a non-contact type IC card reader (not shown) and NFC (NEAR FIELD COMMUNICATION) (not shown) is arranged. When a user holds up an IC card or a mobile device over the upper surface 41 of the top plate cover 40, a wireless communication is established between the IC card or the mobile device and the near field communication device in a non-contact state. Mobile devices include, for example, NFC-enabled cellular phones, smartphones, tablet terminals, tablet PCs, NFC-enabled cameras, NFC-enabled video cameras, and NFC-enabled notebook computers.

(Top Plate Cover)

The structure and function of the top plate cover 40 will be hereinafter described with reference to FIG. 3, FIG. 4, and FIG. 5. The top plate cover 40 is removably mounted to the main body 20a of the image forming apparatus 20 from the front of the image forming apparatus 20. The top plate cover 40 constitutes at least a part of a top surface of the image forming apparatus 20. The top plate cover 40 has a front surface portion 42, a cover member 43, a frame member 44, front side support members 45, and back side support members 46. The front surface portion 42 forms a part of the appearance of the front side of the image forming apparatus 20.

On an upper surface of the cover member 43, the flat surface portion 41a constituting a part of the top surface is provided. The flat surface portion 41a is provided continuously from the front surface portion 42. The frame member 44 is assembled to the cover member 43 and is arranged at a position not visible from the outside. The front side support members 45 and the back side support members 46 are assembled to the frame member 44. The cover member 43, the frame member 44, the front side support members 45, and the back side support members 46 are integrally assembled as the top plate cover 40. Since the top plate cover 40 is integrally formed, the top plate cover 40 can be mounted to and removed from the frame 90 of the image forming apparatus 20 as a one-piece member.

The frame 90 has the frame upper surface portion 91, a frame front surface portion 92 and a frame inner surface portion 93. The frame front surface portion 92 and the frame inner surface portion 93 have surfaces extending substantially at right angles to the frame upper surface portion 91, respectively. The top plate cover 40 is arranged on the upper side of the frame upper surface portion 91 of the frame 90. The top plate cover 40 has the front side support members (first mounting portions) 45 on the front side of the image forming apparatus 20, that is, on an upstream side in a mounting direction MD of the top plate cover 40 to the main body 20a of the image forming apparatus 20. When the top plate cover 40 is mounted on the main body 20a of the image forming apparatus 20, the front side support members (first mounting portions) 45 are fixed to the frame front surface portion 92 provided on the frame 90 of the image forming apparatus 20 by screws (fastening members) 50. The screws 50 are inserted from the front of the image forming apparatus 20 in the mounting direction MD. That is, the axes of the screws 50 extend in a direction from the front side toward the back side of the image forming apparatus 20, the direction being the mounting direction MD. Although the embodiment describes the configuration in which the axes of the screws 50 extend in the front-back direction, the axes may be inclined with respect to the front-back direction as long as the screws 50 can be fastened from the front of the image forming apparatus 20. The top plate cover 40 has the back side support members (second mounting portions) 46 on the back side of the top plate cover 40, that is, on a downstream side in the mounting direction MD. When the top plate cover 40 is mounted on the main body 20a of the image forming apparatus 20, the back side support members (second mounting portions) 46 of the top plate cover 40 are inserted into support holes 94 provided in the frame inner surface portion 93 provided in the frame 90 of the image forming apparatus 20, and the positions of the back side support members in the height direction are regulated. The back side support members 46 have protruding portions expanding in the mounting direction MD and in the left-right direction. The support holes 94 are provided with slits elongated in the left-right direction.

Figure 5:
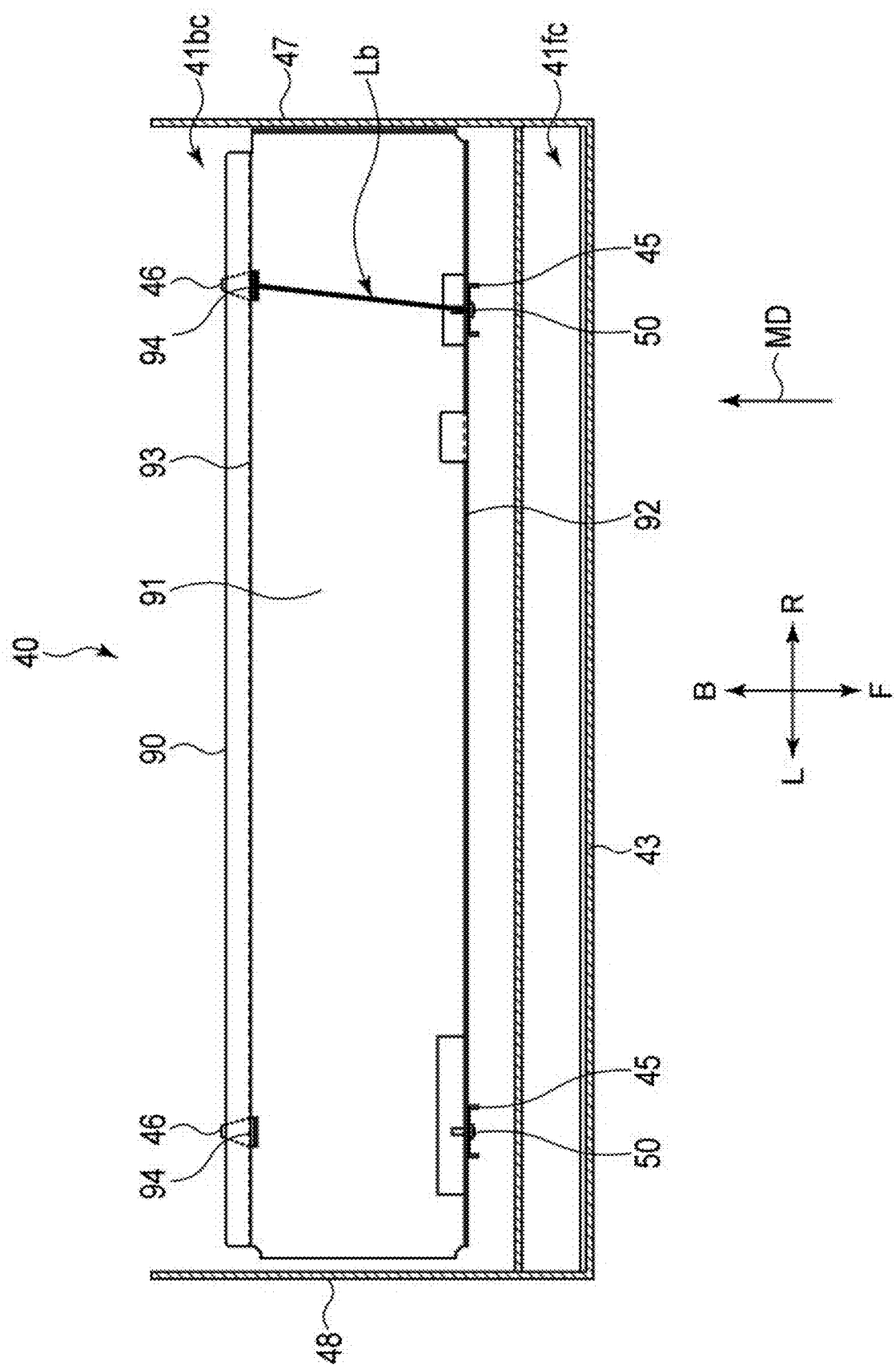
FIG. 5 is a horizontal cross-sectional view of the top plate cover taken along line V-V of FIG. 4.

FIG. 5 is a horizontal cross-sectional view of the top plate cover 40 taken along line V-V of FIG. 4. The two front side support members 45 are arranged in the left-right direction (the right direction R and the left direction L) in the forward direction F of the top plate cover 40. The front side support members 45 are abutted against the frame front surface portion 92 in the backward (rearward) direction B and fastened to the frame front surface portion 92 by the screws 50. The front side support members 45 are supported by the frame front surface portion 92 in a non-movable manner in all directions with respect to the frame front surface portion 92. The two back side support members 46 are arranged in the left-right direction (the right direction R and the left direction L) in the backward direction B of the top plate cover 40. The back side support members 46 are inserted into the support holes 94 of the frame inner surface portion 93 in the backward direction B. The back side support members 46 are supported by the frame inner surface portion 93 movably in the forward direction F and in the backward direction B with respect to the frame inner surface portion 93.

The top plate cover 40 is independently mounted to the frame 90 by the screws 50 fastened in the backward direction B without being mounted to other exterior covers. The screws 50 are attached at positions lower than a lower end of the front surface portion of the top plate cover 40 in the vertical direction. Therefore, when the screws 50 of the fastening portions of the front side support members 45 are removed, the top plate cover 40 can be removed from the image forming apparatus 20 in the forward direction F without removing the image reading portion 80 adjacent to the top plate cover 40. Further, since the top plate cover 40 is fixed only by the screws 50 fastened in the backward direction B, even when the image forming system 1 is constituted by connecting the feeding apparatus 10 and the post-processing apparatus 30 as adjacent apparatuses to the image forming apparatus 20, the top plate cover 40 can be removed independently as a single unit. Therefore, even after the image forming system 1 is installed at the user's place, the work of retrofitting an optional device such as a near field communication device to the image forming apparatus 20 according to the user's request can be easily performed.

In the embodiment, the top plate cover 40 is fixed to the frame 90 by only two front side support members (a plurality of fixing portions) 45. In the inner side of the top plate cover 40 in the backward direction B, the top plate cover 40 is restricted to move only in the up-down direction (the upward direction U and the downward direction D) with respect to the frame 90 by two back side support members (a plurality of support portions) 46. According to the embodiment, the upper surface 41, which is an outline surface of the top plate cover 40, is not fixed to a fixing member provided on the frame 90 in the downward direction D. Therefore, the flat surface portion 41a can be made wider without providing a fixing hole in the flat surface portion 41a of the upper surface 41 of the top plate cover 40.

In the embodiment, the top plate cover 40 is provided with the two front side support members 45 and the two back side support members 46. However, the number of the front side support members 45 is not limited to 2. Three, four, five, or more front side support members 45 may be provided on the top plate cover 40. The number of the back side support members 46 is not limited to 2. Three, four, five, or more back side support members 46 may be provided on the top plate cover 40.

After the top plate cover 40 is fixed to the frame 90, the front surface upper cover 60 is mounted to the image forming apparatus 20 so that the screws 50 fastening the front side support members 45 to the frame front surface portion 92 do not appear in the appearance of the image forming apparatus 20. The front surface upper cover 60 covers the screws 50 and the front side support members 45 so that the screws 50 and the front side support members 45 do not appear on the outer surface (outline portion) of the image forming apparatus 20. In order to provide a space as a mounting space for the front surface upper cover 60 on the front surface of the image forming apparatus 20, the front side support members 45 to which the screws 50 are mounted are positioned in the backward direction B further away from the front surface 42 of the top plate cover 40.

As shown in FIG. 5, in the left-right direction (the right direction R and the left direction L) of the image forming apparatus 20, a position of the left back side support member (second left mounting portion) 46 substantially coincides with a position of the left front side support member (first left mounting portion) 45. The left-right direction of the image forming apparatus 20 is orthogonal to the mounting direction MD of the top plate cover 40. In the left-right direction of the image forming apparatus 20, a position of the right back side support member (second right mounting portion) 46 is disposed more to the outline side of the image forming apparatus 20, that is, more to the right side surface 47 of the top plate cover 40, than a position of the right front side support member (first right mounting portion) 45. However, the embodiment is not limited to this. In the left-right direction (the right direction R and the left direction L) of the image forming apparatus 20, the right back side support member 46 may be provided at a position substantially coincident with the right front side support member 45 or at a position closer to the right side surface 47 in the right direction R than the right front side support member 45. That is, a distance between the right back side support member 46 and the right side surface 47 may be equal to or shorter than a distance between the right front side support member 45 and the right side surface 47. In the left-right direction (the right direction R and the left direction L) of the image forming apparatus 20, the left back side support member 46 may be provided at a position substantially coincident with the left front side support member 45 or at a position closer to the left side surface 48 in the left direction L than the left front side support member 45. That is, a distance between the left back side support member 46 and the left side surface 48 may be equal to or shorter than a distance between the left front side support member 45 and the left side surface 48.

The right side surface 47 and the left side surface 48 of the top plate cover 40 extend in parallel to the mounting direction MD of the top plate cover 40. The upper surface 41, the right side surface 47, and the left side surface 48 of the top plate cover 40 are not provided with screw holes for fixing the top plate cover 40 to the main body 20a of the image forming apparatus 20. Further, the upper surface 41, the right side surface 47, and the left side surface 48 of the top plate cover 40 are not provided with any engaged portions with which engaging devices engage, the engaging devices connecting the image forming apparatus 20 to the feeding apparatus 10 and the post-processing apparatus 30, which are adjacent to the image forming apparatus 20. Therefore, even when the feeding apparatus 10 and the post-processing apparatus 30 are connected to the image forming apparatus 20, the top plate cover 40 can be easily mounted to and removed from the main body 20a.

(Action of External Force)

Figure 6:
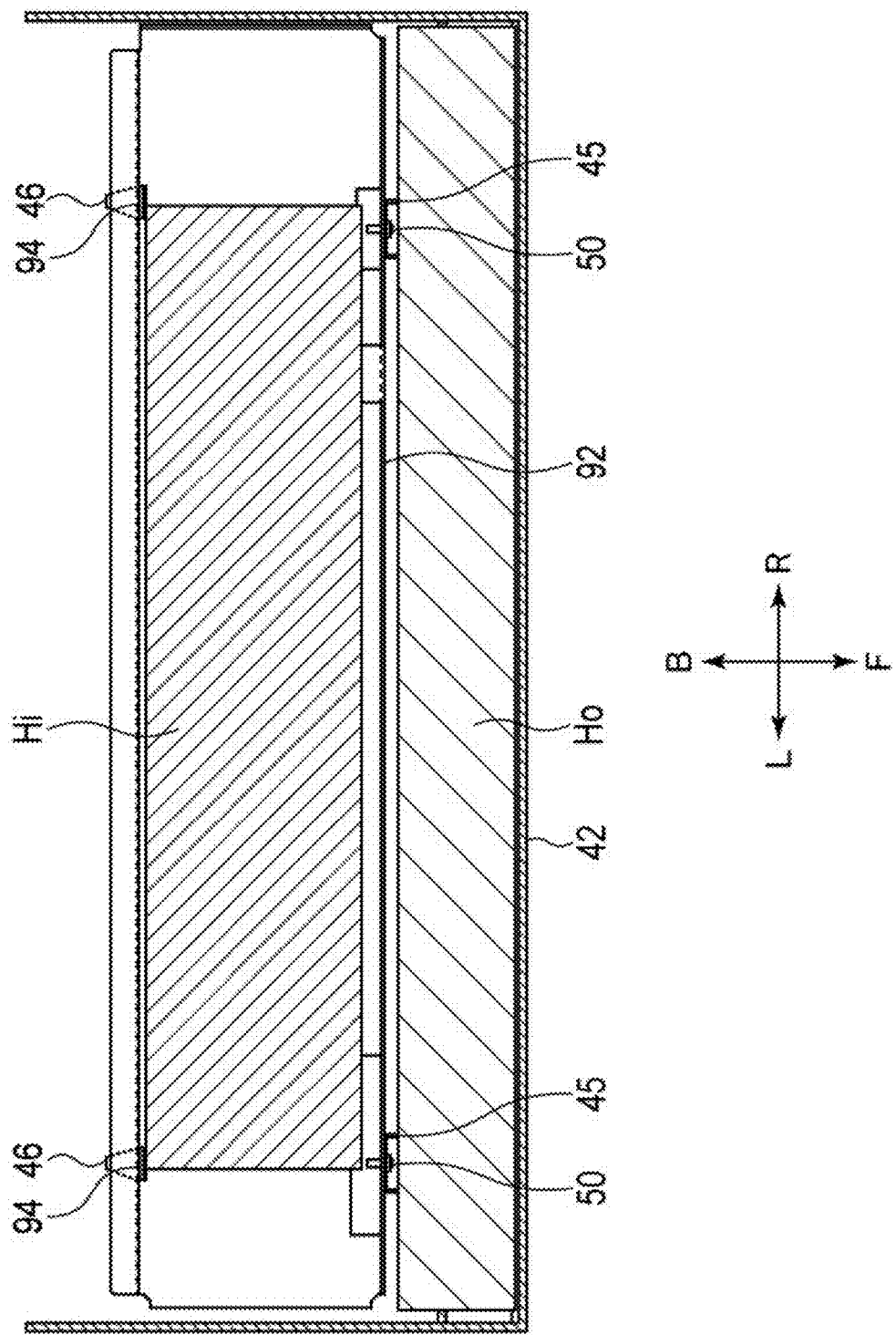
FIG. 6 is a horizontal cross-sectional view of the top plate cover showing ranges on which a downward force is exerted.

Next, an action of an external force exerted on the top plate cover 40 will be described with reference to FIG. 4, FIG. 5, FIG. 6, and FIG. 7. As shown in FIG. 4, when the user performs a work on the flat surface portion 41a of the upper surface 41 of the top plate cover 40, a downward force FD is exerted on the flat surface portion 41a in the downward direction D. FIG. 6 is a horizontal cross-sectional view of the top plate cover 40 showing ranges Hi and Ho on which the downward force FD is exerted. The range Hi is defined by the right front side support member 45, the left front support member 45, the left back side support member 46, and the right back side support member 46. When the downward force FD is exerted on the flat surface portion 41a within the range Hi, the downward force FD can be received by the front side support members 45 and the back side support members 46.

The downward force FD may be exerted on the flat surface portion 41a outside the range Hi. The range Ho shown in FIG. 6 is the front side portion of the top plate cover 40 outside the range Hi. The range Ho is a range between the front surface 42 of the top plate cover 40 and the frame front surface portion 92 of the frame 90. The range Ho is in the forward direction F from the screws 50 of the front side support members 45 and in the backward direction B from the front surface 42 of the top plate cover 40. The upper surface 41 of the top plate cover 40 projects in the forward direction F from the positions of the front side support members 45. When a user performs a work on the flat surface portion 41a of the upper surface 41 of the top plate cover 40, if the downward force FD is exerted on the flat surface portion 41a within the range Ho, the downward force FD is exerted on the flat surface portion 41a in the forward direction F from the front side support members 45 in the downward direction D. As shown in FIG. 4, a moment Fm is generated in the top plate cover 40 by the downward force FD exerted on the flat surface portion 41a in the forward direction F from the front side support members 45.

When the moment Fm is exerted on the top plate cover 40, an upward force FU for lifting the back side portion of the top plate cover 40 is exerted on the top plate cover 40 with the fastening portions by the screws 50 of the front side support members 45 as a fulcrum Ps. However, since the back side support members 46 of the top plate cover 40 are engaged with the support holes 94 of the frame inner surface portion 93, lifting of the back side portion of the top plate cover 40 by the upward force FU is suppressed. That is, the movement of the back side support members 46 in the upward direction U is restricted by the back side support members 46 abutting on edges of the support holes 94 of the frame inner surface portion 93.

Figure 7:
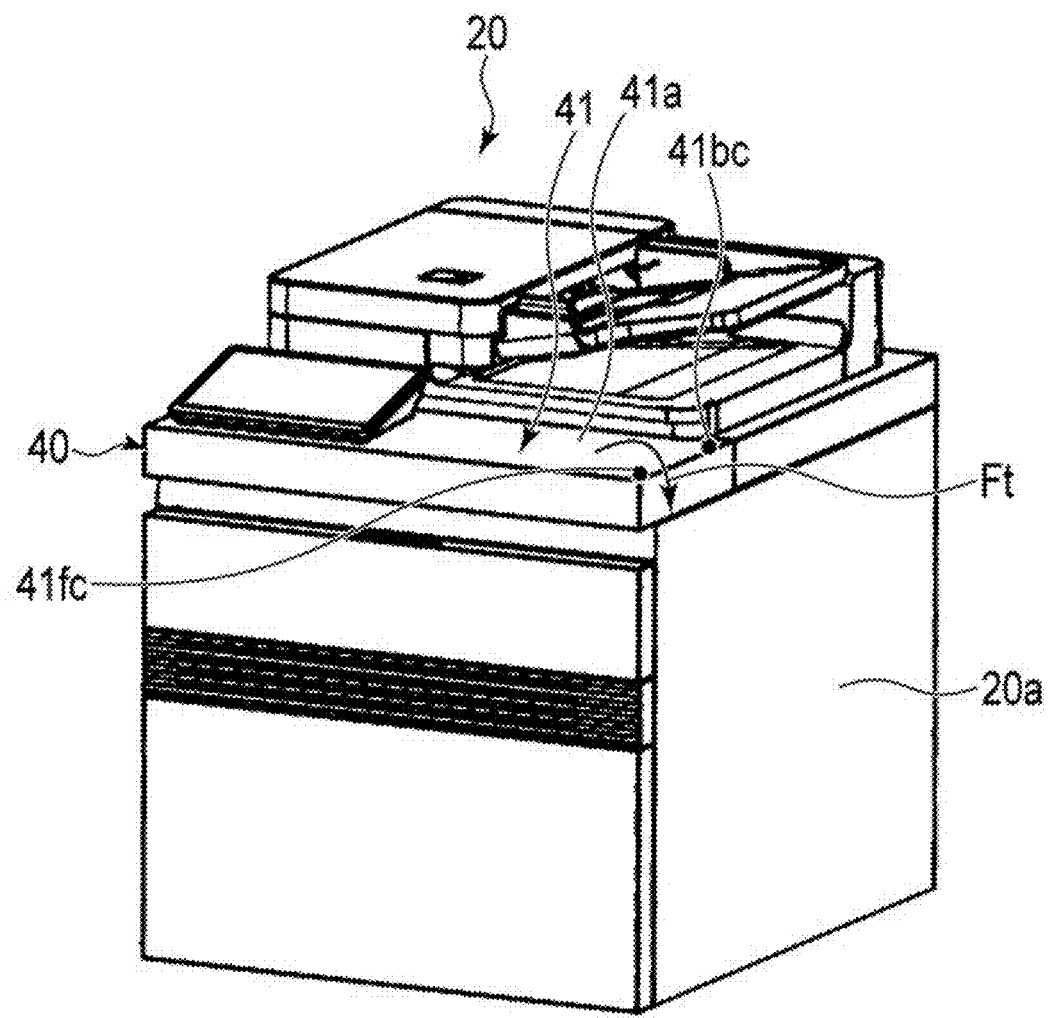
FIG. 7 is a perspective view of the image forming apparatus showing a torsional force exerted on the top plate cover.

Further, as shown in FIG. 4, FIG. 5, and FIG. 7, when the downward force FD is exerted on an upper front corner portion 41fc located at an end portion in the right direction R at the front side portion of the top plate cover 40, a torsional force Ft is exerted on the top plate cover 40. FIG. 7 is a perspective view of the image forming apparatus 20 showing the torsional force Ft exerted on the top plate cover 40. When the torsional force Ft is exerted on the top plate cover 40, as shown in FIG. 5, a line segment connecting the right front side support member 45 and the right back side support member 46 acts as a guy wire Lb and receives the torsional force Ft. Therefore, the upward force FU for lifting an upper surface back side corner portion 41bc of the upper surface 41 is suppressed. The action of the guy wire Lb to suppress the upward force FU is stronger when the position of the right back side support member 46 is closer to the right side surface 47 (the right outline of the image forming apparatus 20) of the top plate cover 40 than the position of the right front side support member 45 in the left-right direction of the image forming apparatus 20.

In the embodiment, the upper surface 41 of the top plate cover 40 protrudes in the forward direction F from the frame front surface portion 92. The space between the top plate cover 40 and the front door 61 is covered with the front surface upper cover 60. However, the front surface upper cover 60 is not necessarily required. For example, the front door 61 may be configured such that the upper portion of the front door 61 covers the screws 50 of the front side support members 45 when the front door 61 is closed.

As described above, in the top plate cover 40 which is removable from the main body 20a of the image forming apparatus 20, the back side support members 46 are inserted into the support holes 94 in the mounting direction MD (FIG. 4), and the front side support members 45 are fixed to the frame front surface portion 92 by screws 50. Thus, the top plate cover 40 can be easily mounted to and removed from the main body 20a of the image forming apparatus 20, and the robustness of the top plate cover 40 against the external forces can be secured. Therefore, the maintainability and user convenience of the top plate cover 40 can be improved.

According to the embodiment, the top plate cover 40 can be fixed to the main body 20a of the image forming apparatus 20 by a user accessing from the front of the image forming apparatus 20 in the backward direction B. The back side support members 46 provided in the backward direction B of the top plate cover 40 are supported by the frame inner surface portion 93 only by being inserted into the support holes 94 of the frame inner surface portion 93 without using a fastening member such as screws 50. Therefore, it is possible to provide the image forming apparatus 20 which secures robustness against the external forces while securing the maintainability and user convenience. According to the embodiment, the top plate cover 40 can be easily mounted to and removed from the front of the image forming apparatus 20.

In the embodiment, the image forming system 1 is constituted by connecting the feeding apparatus 10, the image forming apparatus 20, and the post-processing apparatus 30. However, the embodiment is not limited to this. The adjacent apparatus connected to the image forming apparatus 20 may be a conveyance apparatus, an inspection apparatus, an inserter, or an apparatus having other functions. The image forming apparatus 20 may be a stand-alone image forming apparatus which is not used in the image forming system 1 but operates independently.

In the embodiment, the top plate cover 40 is provided in the image forming apparatus 20. However, the embodiment is not limited to this. A top plate cover constituting a top surface of an apparatus such as the feeding apparatus 10, the post-processing apparatus 30, the conveyance apparatus, the inspection apparatus, or the inserter may be configured like the top plate cover 40 of the embodiment.

According to the embodiment, the top plate cover can be easily mounted to and removed from the front of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-073473, filed Apr. 23, 2021, which is hereby incorporated by reference herein in its entirety.

What is claimed is:

1. An image forming apparatus configured to form an image on a recording medium, the image forming apparatus comprising:
a frame;
a top plate cover which is removable from the frame and has a top surface portion constituting at least a part of a top surface of the image forming apparatus;
a screw; and
a front door provided below the top plate cover in a vertical direction and openable and closable with respect to the frame,
wherein the frame includes an upper surface portion opposite to the top surface portion, a front surface portion provided at a front side with respect to the upper surface portion in a front-back direction of the image forming apparatus, and a back surface portion provided at a back side with respect to the upper surface portion in the front-back direction and provided with a through-hole,
wherein the top plate cover includes a first mounting portion fixed to the front surface portion, and a second mounting portion provided at a back side with respect to the first mounting portion in the front-back direction and inserted into the through-hole, and
wherein the screw is inserted in the front-back direction to fix the front surface portion of the frame and the first mounting portion of the top plate cover.

2. The image forming apparatus according to claim 1, wherein the through-hole is an elongated slit in a left-right direction, and
wherein the second mounting portion includes a protruding portion expanding in the front-back direction and in the left-right direction.

3. The image forming apparatus according to claim 1, wherein the top plate cover includes a right side surface provided at a right side with respect to the top surface portion in a left-right direction of the image forming apparatus and a left side surface provided at a left side with respect to the top surface portion in the left-right direction,
wherein the first mounting portion includes a first right mounting portion and a first left mounting portion;
wherein the second mounting portion includes a second right mounting portion and a second left mounting portion;
wherein a distance between the second right mounting portion and the right side surface is equal to or shorter than a distance between the first right mounting portion and the right side surface, and
wherein a distance between the second left mounting portion and the left side surface is equal to or shorter than a distance between the first left mounting portion and the left side surface.

4. The image forming apparatus according to claim 1, wherein the top surface portion of the top plate cover protrudes to a front side with respect to the first mounting portion in the front-back direction.

5. The image forming apparatus according to claim 1, wherein the top plate cover includes a front surface portion which is continuous from the top surface portion and constitutes an appearance on a front side of the image forming apparatus, and
wherein the first mounting portion is provided at a back side with respect to the front surface portion of the top plate cover in the front-back direction.

6. The image forming apparatus according to claim 1, wherein the screw fixes the first mounting portion and the front surface portion of the frame at a position lower than a lower end of the front surface portion of the top plate cover in a vertical direction.

7. The image forming apparatus according to claim 1, further comprising another cover covering the screw.

8. The image forming apparatus according to claim 1, further comprising an image reading apparatus which is provided at a back side with respect to the top plate cover in the front-back direction and configured to read an image formed on a recording medium.

9. An image forming system comprising:
an image forming apparatus according to claim 1;
a storing apparatus which is provided adjacently to an upstream side with respect to the image forming apparatus in a recording medium conveying direction of the image forming apparatus and configured to store the recording medium to be supplied to the image forming apparatus; and
a processing apparatus which is provided adjacent to a downstream side with respect to the image forming apparatus in the recording medium conveying direction of the image forming apparatus and configured to perform a predetermined processing on the recording medium on which the image is formed by the image forming apparatus.

10. An image forming apparatus configured to form an image on a recording medium, the image forming apparatus comprising:

a frame;
a top plate cover which is removable from the frame and has a top surface portion constituting at least a part of a top surface of the image forming apparatus; and
a screw,
wherein the frame includes an upper surface portion opposite to the top surface portion, a front surface portion provided at a front side with respect to the upper surface portion in a front-back direction of the image forming apparatus, and a back surface portion provided at a back side with respect to the upper surface portion in the front-back direction and provided with a through-hole,
wherein the top plate cover includes a first mounting portion fixed to the front surface portion, and a second mounting portion provided at a back side with respect to the first mounting portion in the front-back direction and inserted into the through-hole,
wherein the screw is inserted in the front-back direction to fix the front surface portion of the frame and the first mounting portion of the top plate cover,
wherein the through-hole is an elongated slit in a left-right direction, and
wherein the second mounting portion includes a protruding portion expanding in the front-back direction and in the left-right direction.

11. The image forming apparatus according to claim 10, wherein the top plate cover includes a right side surface provided at a right side with respect to the top surface portion in a left-right direction of the image forming apparatus and a left side surface provided at a left side with respect to the top surface portion in the left-right direction,
wherein the first mounting portion includes a first right mounting portion and a first left mounting portion;
wherein the second mounting portion includes a second right mounting portion and a second left mounting portion;
wherein a distance between the second right mounting portion and the right side surface is equal to or shorter than a distance between the first right mounting portion and the right side surface, and
wherein a distance between the second left mounting portion and the left side surface is equal to or shorter than a distance between the first left mounting portion and the left side surface.

12. The image forming apparatus according to claim 10, wherein the top surface portion of the top plate cover protrudes to a front side with respect to the first mounting portion in the front-back direction.

13. The image forming apparatus according to claim 10, wherein the top plate cover includes a front surface portion which is continuous from the top surface portion and constitutes an appearance on a front side of the image forming apparatus, and
wherein the first mounting portion is provided at a back side with respect to the front surface portion of the top plate cover in the front-back direction.

14. The image forming apparatus according to claim 10, wherein the screw fixes the first mounting portion and the front surface portion of the frame at a position lower than a lower end of the front surface portion of the top plate cover in a vertical direction.

15. The image forming apparatus according to claim 10, further comprising another cover covering the screw.

16. The image forming apparatus according to claim 10, further comprising a front door provided below the top plate cover in a vertical direction and openable and closable with respect to the frame.

17. The image forming apparatus according to claim 10, further comprising an image reading apparatus which is provided at a back side with respect to the top plate cover in the front-back direction and configured to read an image formed on a recording medium.

18. An image forming apparatus configured to form an image on a recording medium, the image forming apparatus comprising:
a frame;
a top plate cover which is removable from the frame and has a top surface portion constituting at least a part of a top surface of the image forming apparatus; and
a screw,
wherein the frame includes an upper surface portion opposite to the top surface portion, a front surface portion provided at a front side with respect to the upper surface portion in a front-back direction of the image forming apparatus, and a back surface portion provided at a back side with respect to the upper surface portion in the front-back direction and provided with a through-hole,
wherein the top plate cover includes a first mounting portion fixed to the front surface portion, and a second mounting portion provided at a back side with respect to the first mounting portion in the front-back direction and inserted into the through-hole,
wherein the screw is inserted in the front-back direction to fix the front surface portion of the frame and the first mounting portion of the top plate cover, and
wherein the top surface portion of the top plate cover protrudes to a front side with respect to the first mounting portion in the front-back direction.

19. The image forming apparatus according to claim 18, wherein the top plate cover includes a front surface portion which is continuous from the top surface portion and constitutes an appearance on a front side of the image forming apparatus, and
wherein the first mounting portion is provided at a back side with respect to the front surface portion of the top plate cover in the front-back direction.

* * * * *